(12) United States Patent
Moran et al.

(10) Patent No.: US 6,183,805 B1
(45) Date of Patent: Feb. 6, 2001

(54) CONTINUOUS MANUFACTURE OF PROCESS CHEESE

(75) Inventors: James W. Moran, Antioch; Gary W. Trecker, Lake Zurich; Susan P. Monckton, Glen Ellyn, all of IL (US)

(73) Assignee: Kraft Foods, Inc., Northfield, IL (US)

( * ) Notice: Under 35 U.S.C. 154(b), the term of this patent shall be extended for 0 days.

(21) Appl. No.: 09/427,499

(22) Filed: Oct. 26, 1999

Related U.S. Application Data

(60) Provisional application No. 60/105,845, filed on Oct. 27, 1998.

(51) Int. Cl.[7] .................................................. A23C 19/00
(52) U.S. Cl. ........................ 426/582; 426/478; 426/490; 426/491
(58) Field of Search ............... 426/36, 39, 580, 426/582, 656, 657, 478, 490, 491

(56) References Cited

U.S. PATENT DOCUMENTS

| | | | |
|---|---|---|---|
| 4,244,971 | 1/1981 | Wargel et al. | 426/35 |
| 4,268,528 | 5/1981 | Montigny | 426/40 |
| 4,271,201 | 6/1981 | Stenne | 426/40 |
| 4,401,679 | 8/1983 | Rubin et al. | 426/36 |
| 4,497,834 | 2/1985 | Barta | 426/42 |
| 4,820,530 * | 4/1989 | Moran et al. | 426/491 X |
| 4,958,599 * | 9/1990 | Sagara et al. | 426/582 X |
| 5,037,659 * | 8/1991 | Trecker et al. | 426/40 |
| 5,165,945 | 11/1992 | Yee et al. | 426/36 |
| 5,213,827 * | 5/1993 | Nauth et al. | 426/36 |
| 5,262,183 | 11/1993 | Moran et al. | 426/40 |
| 5,330,773 | 7/1994 | Piliero et al. | 426/36 |
| 5,330,780 | 7/1994 | Yee et al. | 426/582 |
| 5,334,398 * | 8/1994 | Sueyasu et al. | 426/36 |
| 5,356,639 | 10/1994 | Jameson et al. | 426/40 |
| 5,356,640 | 10/1994 | Jameson et al. | 426/40 |
| 5,378,479 * | 1/1995 | Trecker et al. | 426/42 |
| 5,554,397 | 9/1996 | Tanaka et al. | 426/36 |
| 6,093,424 * | 7/2000 | Han et al. | 426/42 |

FOREIGN PATENT DOCUMENTS

| | | |
|---|---|---|
| 0755630 * | 1/1997 | (EP) . |
| 1 526 935 | 10/1978 | (GB) . |
| 95/14389 | 6/1995 | (WO) . |
| 95/185390 | 7/1995 | (WO) . |
| 00/27214 * | 5/2000 | (WO) . |

* cited by examiner

*Primary Examiner*—Milton Cano
(74) *Attorney, Agent, or Firm*—Fitch, Even, Tabin & Flannery

(57) ABSTRACT

A method for producing a cheese product directly from milk in a short period of time is provided. In the method, pasteurized milk is treated with lactic acid to provide an acidified milk product. The resulting acidified milk is then subjected to ultrafiltration (UF), and optionally diafiltration (DF), to form a UF retentate (or UF/DF retentate if diafiltration is used) which is concentrated by about a factor of about 4 to about 7 and which has a lactose concentration of about 2.5 to about 4.0 percent (UF retentate) or about 0.5 to about 2.5 percent (UF/DF retentate). After adding lactic acid and salt, the UF or UF/DF retentate is subject to an evaporation step to form a precheese. The resulting precheese has a total solid content of about 30 to about 70 percent. The precheese, with added flavorants and other additives (including, for example, emulsifying salts) is then subject to conventional cheese processing conditions in, for example, a laydown cooker. The resulting process cheese or process cheese-type product is ready for immediate packaging and does not require a separate curing step. The process cheese or process cheese-type product is similar in flavor and texture characteristics to conventional process cheeses.

12 Claims, 2 Drawing Sheets

CONTINUOUS MANUFACTURE OF PROCESS CHEESE

RELATED APPLICATIONS

This application is based on, and claims benefit of U.S. Provisional Patent Application Serial No. 60/105,845 filed on Oct. 27, 1998.

FIELD OF THE INVENTION

The present invention relates to a method for producing process cheese or process cheese-type products by the direct conversion of milk. More particularly, the present invention provides a direct and fast method for producing process cheese or cheese products directly from milk without fermentation, enzymatic treatment, and/or intermediate steps of forming and separating curds and whey. The present process can be used to produce fat-free, reduced-fat, low-fat, and/or full-fat cheeses having similar organoleptic properties to cheeses prepared from conventional curds and whey processes. The present process is especially adapted for semi-continuous or continuous manufacture of process cheese-type products.

BACKGROUND OF THE INVENTION

Cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. The whey, which contains significant amounts of whey protein, is generally further processed for protein and fat recovery. Curing typically takes place over a lengthy period of time (often several months or even longer) under controlled conditions. Process cheese-type products can be prepared from such conventional cheeses by grinding and then heating the ground cheeses with emulsifying salt or salts in, for example, a laydown cooker.

The name or label given to the resulting product depends upon the ingredients used, its composition, and, in some instances, regulations promulgated by the U.S. Food and Drug Administration 21 C.F.R. §§133.169–180. For example, the term "pasteurized process cheese" refers to a product comprising a blend of cheeses to which an emulsifying agent, usually an emulsifying salt, and possibly acids, have been added, and which has then been worked and heated into a homogeneous plastic mass.

The term "pasteurized process cheese food" refers to a product which is prepared from the same materials and the same processes used for manufacture of process cheese. However, cheese food generally has added dairy ingredients such as cream, milk, skimmed milk, whey, or any of these from which part of the water has been removed (e.g., concentrated skimmed milk). The moisture level in process cheese food is generally higher than that of process cheese and may be up to about 44%. Fat is generally present at a level of not less than 23%. The term "pasteurized process cheese spread" refers to a product which is similar to cheese food, in the sense that it can contain the indicated dairy ingredients. Process cheese spread, however, may have a moisture level as high as 60%, and a minimum fat level of 20%. Process cheese, process cheese food, and process cheese spread are generally referred to as "standardized products", since their methods of manufacture and composition are determined by Federal Standards of Identity.

As used herein, the term "process cheese-type products" includes those products known and referred to as "pasteurized process cheese," "pasteurized process cheese food," "pasteurized process cheese spread," and "pasteurized process cheese product." "Process cheese-type products" also includes products resembling process cheese, process cheese food, process cheese spread, and process cheese product, regardless of whether or not they meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese product regardless of the ingredients or manufacturing steps employed, and regardless of whether the Standards have been met.

There have been many efforts to provide simplified processes for making cheese or cheese-type products. U.S. Pat. No. 4,268,528 (May 19, 1981) provides a method for producing soft cheeses wherein milk is acidified to a pH less than 4.4 to coagulate the milk followed by ultrafiltration to produce a flowable acidified retentate containing flocculated casein. After cooling, the acidified retentate is stirred, taking care to avoid foaming, to deflocculate the flocculated casein after which rennet is added to form the cheese.

U.S. Pat. No. 4,271,201 (Jun. 2, 1981) provides a method whereby denatured whey protein is mixed with milk either before or after ultrafilitration. The resulting ultrafiltered milk is then coagulated using a lactic starter and then drained to produce a curd containing substantially the same amount of total serum protein as the original milk.

U.S. Pat. No. 4,401,679 (Aug. 30, 1983) provides a method for preparing a cheese base wherein milk is treated with ultrafiltration combined with diafiltration and evaporation. The ultrafiltered milk is innocualted with an acid culture before evaporation and acidified after evaporation to form the cheese base.

U.S. Pat. No. 4,948,599 (Aug. 14, 1990) provides a method for the continuous production of cheese using ultrafiltration. The ultrafiltered milk is cooled and acidified to a pH of 4.8 to 5.8 without coagulation. A milk coagulating enzyme or a lactic acid starter is then added and the mixture quickly heated to 25 to 84° C. to form cheese curds.

U.S. Pat. No. 4,497,834 (Feb. 5, 1985) provides a simplified method of making a dairy-based food product wherein milk is first condensed to the proportion of milk solids and moisture corresponding substantially to that desired in the final product after which the concentration of lactose in the milk is reduced by hydrolysis, molecular sieving, or ultrafiltration to below about 15 percent by weight at which crystallization was reported to occur. The mixture is then gelled by heating and thereafter cooled, manipulated, and packaged using conventional techniques.

U.S. Pat. No. 5,165,945 (Nov. 24, 1992) and U.S. Pat. No. 5,330,780 (Jul. 24, 1994) describe a process for producing cheese containing whey protein. Ultrafiltered and diafiltrated milk is renneted and then heated to coagulate the mixture and deactivate the rennet. Water is then removed without removing soluble proteins to produce a cheese which contains casein and substantially all of the soluble protein in the original feed stock.

U.S. Pat. No. 5,330,773 (Jul. 19, 1994) provides a method for producing a low-fat cheese food product wherein a gelatin or gum is added to low-fat ultrafiltrated milk. The resulting milk blend is maintaining at a temperature such that gelling does not occur. After adding an activator such as lactic acid to form a paste, it is subjected to draining, brining, and ripening to form the low-fat cheese food product.

U.S. Pat. No. 5,262,183 (Nov. 16, 1993) provides a method in which a milk retentate is fermentated to a pH of about 4.8 to about 5.6 without coagulation. After adding a milk clotting enzyme in a non-coagulating amount, water is removed by evaporation to obtain a solids content of about 55 percent or higher to produce a pre-cheese. The pre-cheese is cured (generally over a three to fourteen day period) to convert at least 65 percent of kappa casein to para kappa casein.

U.S. Pat. No. 5,356,639 (Oct. 18, 1994) and U.S. Pat. No. 5,356,640 (Oct. 18, 1994) provide a method for producing cheese containing substantially all of the casein and whey protein in the starting milk using ultrafilration and diafiltration. The retentate is treated with salt to an ionic strength which prevents coagulation during fermentation and then fermented. Water is then removed the fermented concentrate by evaporation to obtain the cheese.

U.S. Pat. No. 5,554,397 (Sep. 10, 1996) provides a method for producing a cheese-type food from powdered milk. The powdered milk is produced from liquid milk by ultrafiltration, adjusting the pH of the ultrafiltered milk to 5.0 to 5.8, and then spray dried. The spray dried powdered milk, emulsifying salts, and water are heated to form a liquid mixture which is then cooled to obtain the cheese-type food.

In spite of the numerous attempts and the clear advantages such simplified processes would provide, they have generally not been commercially successful and, thus, the conventional cheese-making process remains, even with its significant drawbacks, the process of choice.

It would be desirable to provide a method for producing a cheese product which does not involve a whey drainage step and which can be accomplished in a short period of time. It would also be desirable to provide a semi-continuous or continuous method for producing a cheese product directly from milk. The present specification provides such methods.

SUMMARY OF THE INVENTION

The present invention is directed to a process for producing a cheese product directly from milk in a short period of time. In the method, pasteurized milk is treated with lactic acid to provide an acidified milk product. The resulting acidified milk is then subjected to ultrafiltration (UF), and optionally diafiltration (DF), to form a UF retentate (or UF/DF retentate if diafiltration is used) which is concentrated by a factor of about 4 to about 7 and which has a lactose concentration of about 2.5 to about 4.0 percent (UF retentate) or less than about 2.5 percent (UF/DF retentate). The acidification step generally allows for increasing free calcium concentration (relative to bound calcium) so that additional calcium can be removed in the ultrafiltration step. Upwards of about 20 percent of the calcium can be removed in the ultrafiltration step. After adding lactic acid and, optionally, salt, the UF or UF/DF retentate is subject to an evaporation step to form a precheese. The resulting precheese has a water content of about 30 to about 85 percent and a total solid content of about 15 to about 70 percent. The precheese, with added flavorants and other additives (including, for example, emulsifying salts) is then subjected to conventional cheese processing conditions in, for example, a laydown cooker. The resulting process cheese or process cheese-type product is ready for immediate packaging and does not require a separate curing step. The process cheese or process cheese-type product is similar in flavor and texture characteristics to conventional process cheeses.

The current method can be employed as a batch, semi-continuous, or continuous process. When operated as a batch process, the approximate time from acidified milk to process cheese product is on the order of about five hours. Thus, the present process is readily adapted to semi-continuous or continuous operation. It is expected that this time can be reduced to about 1 to about 3 hours in a semi-continuous or continuous process. The present method can be used to produce fat-free, reduced-fat, low-fat, and full-fat cheeses.

The present invention offers several significant advantages over conventional cheese-making processes. For example, the present invention provides a very efficient and rapid process which is readily adapted to semi-continuous or continuous operation. Moreover, the present invention provides a method of cheese-making which provides, as compared to conventional cheese-making process, lower labor costs, reduced capital expenditures, reduced transportation requirements, and lower inventory costs. If desired, the present process could be centrally located with regard to the supplying dairy herds thereby further reducing transportation costs. In addition, the present process requires no separate grinding step or curing step. The present process allows also for more uniform process cheese or process cheese-type products since additives are used to adjust the flavor. Finally, the present process is especially adaptable to a closed system thereby significantly reducing the number of possible points of contamination (especially from airborne contamination).

One object of this invention is to provide a method for producing a process cheese-type product directly from milk, said methods comprising:
(a) treating pasteurized milk with a first edible acid to obtain acidified milk having a pH in the range of about 5.9 to about 6.5;
(b) reducing the lactose content of the acidified milk to about 2.5 to about 4.0 percent and increasing the solids content to about 15 to about 50 percent using ultrafiltration to obtain a UF retentate;
(c) adjusting the pH of the UF retentate to about 4.9 to about 6.3 percent by the addition of a second edible acid to form a treated UF retentate;
(d) removing sufficient water from the treated UF retentate by evaporation to obtain a precheese having a total solid content of about 30 to about 70 percent; and
(e) blending emulsifiers and flavor additives with the precheese at a temperature of about 150 to about 240° F. for a time sufficient to obtain a homogenous process cheese-type product;

wherein enzymes, cultures, or microorganisms are not employed and wherein there is no formation or separation of curds and whey.

Another object of this invention is to provide a process cheese-type product prepared directly from milk by a method comprising:
(a) treating pasteurized milk with a first edible acid to obtain acidified milk having a pH in the range of about 5.9 to about 6.5;
(b) reducing the lactose content of the acidified milk to about 2.5 to about 4.0 percent and increasing the solids content to about 15 to about 50 percent using ultrafiltration to obtain a UF retentate;
(c) adjusting the pH of the UF retentate to about 4.9 to about 6.3 percent by the addition of a second edible acid to form a treated UF retentate;
(d) removing sufficient water from the treated UF retentate by evaporation to obtain a precheese having a total solid content of about 30 to about 70 percent; and (e) blending emulsifiers and flavor additives with the precheese at a temperature of about 150 to about 240° F. for a time sufficient to obtain a homogenous process cheese-type product;

wherein enzymes, cultures, or microorganisms are not employed and wherein there is no formation or separation of curds and whey.

Still another object of the present invention is to provide a method for producing a process cheese-type product directly from milk, said method comprising:

(a) treating pasteurized milk with a first edible acid to obtain acidified milk having a pH in the range of about 5.9 to about 6.2;

(b) reducing the lactose content of the acidified milk to below about 2.5 percent and increasing the solids content to about 15 to about 50 percent using ultrafiltration and diafiltration to obtain a UF/DF retentate;

(c) adjusting the pH of the UF/DF retentate to about 4.9 to about 6.5 percent by the addition of a second edible acid to form a treated UF/DF retentate;

(d) removing sufficient water from the treated UF/DF retentate by evaporation to obtain a precheese having a total solid content of about 30 to about 70 percent; and (e) blending emulsifiers and flavor additives with the precheese at a temperature of about 150 to about 240° F. for a time sufficient to obtain a homogenous process cheese-type product;

wherein enzymes, cultures, or microorganisms are not employed and wherein there is no formation or separation of curds and whey.

Still another object of the present invention is to provide a process cheese-type product prepared directly from milk by a method comprising:

(a) treating pasteurized milk with a first edible acid to obtain acidified milk having a pH in the range of about 5.9 to about 6.2;

(b) reducing the lactose content of the acidified milk to below about 2.5 percent and increasing the solids content to about 15 to about 50 percent using ultrafiltration and diafiltration to obtain a UF/DF retentate;

(c) adjusting the pH of the UF/DF retentate to about 4.9 to about 6.5 percent by the addition of a second edible acid to form a treated UF/DF retentate;

(d) removing sufficient water from the treated UF/DF retentate by evaporation to obtain a precheese having a total solid content of about 30 to about 70 percent; and (e) blending emulsifiers and flavor additives with the precheese at a temperature of about 150 to about 240° F. for a time sufficient to obtain a homogenous process cheese-type product;

wherein enzymes, cultures, or microorganisms are not employed and wherein there is no formation or separation of curds and whey.

These and other objects and advantages of the present invention will be apparent from a consideration of the present specification, including the claims and figures.

DETAILED DESCRIPTION OF THE INVENTION

The present invention provides a process for the direct and rapid a conversion of milk—including full-fat, reduced-fat, and skim milk—in to process cheese or process cheese-type products. The present methods are especially preferred for the production of reduced-fat and fat-free cheeses. The process described herein does not require conventional enzymes and/or cultures and/or microorganisms. Moreover the process does not require the formation of curds and whey nor, of course, the separation of curds and ad Whey. The present invention employs an acidification step to form an acidified milk with a pH of about 5.9 to 6.5, followed by an ultrafiltration step to form an UF retentate which is concentrated by a factor of about 4 to about 7, and an evaporation step to form a precheese having a total solid content of about 30 to about 70 percent. The precheese is then treated using conventional processing equipment (e.g., laydown cooker), during which time various flavorants, colorants, stabilizers, emulsifiers, and the like can be added, to form the desired process cheese or process cheese-type products. The process cheese or process cheese-type products obtained by this invention have similar flavor, texture, mouthfeel, and meltability of conventional process cheeses prepared using the curd and whey technique. Since the conventional curd and whey separation is not employed in the present invention, the whey proteins normally discarded with the separated whey are retained in the process cheese or process cheese-type product, thereby producing a more nutritious food product.

Figure 1:
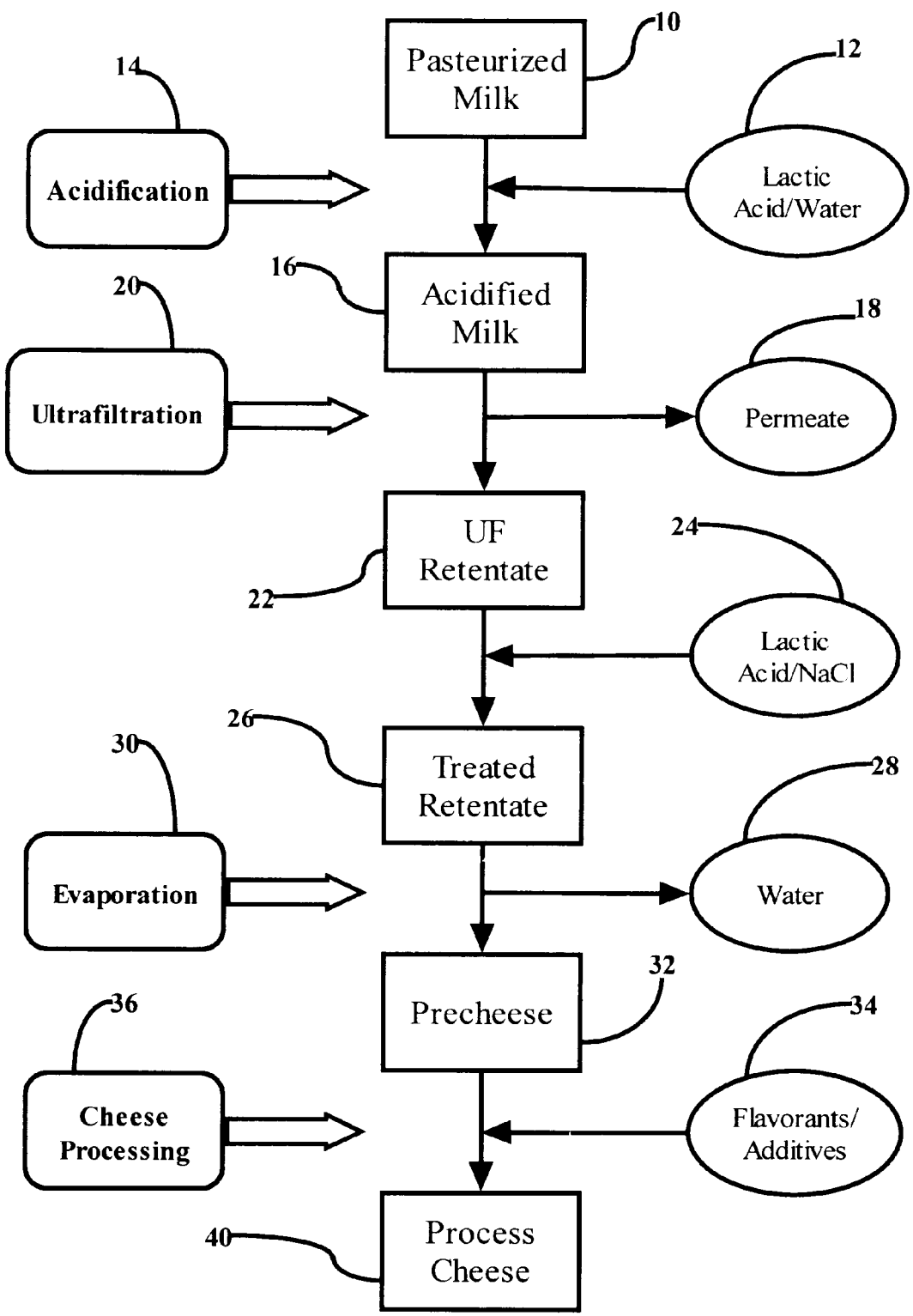
FIG. 1 is a flowchart illustrating one embodiment of the present invention using acidification, ultrafiltration, evaporation, and cheese processing.
Figure 2:
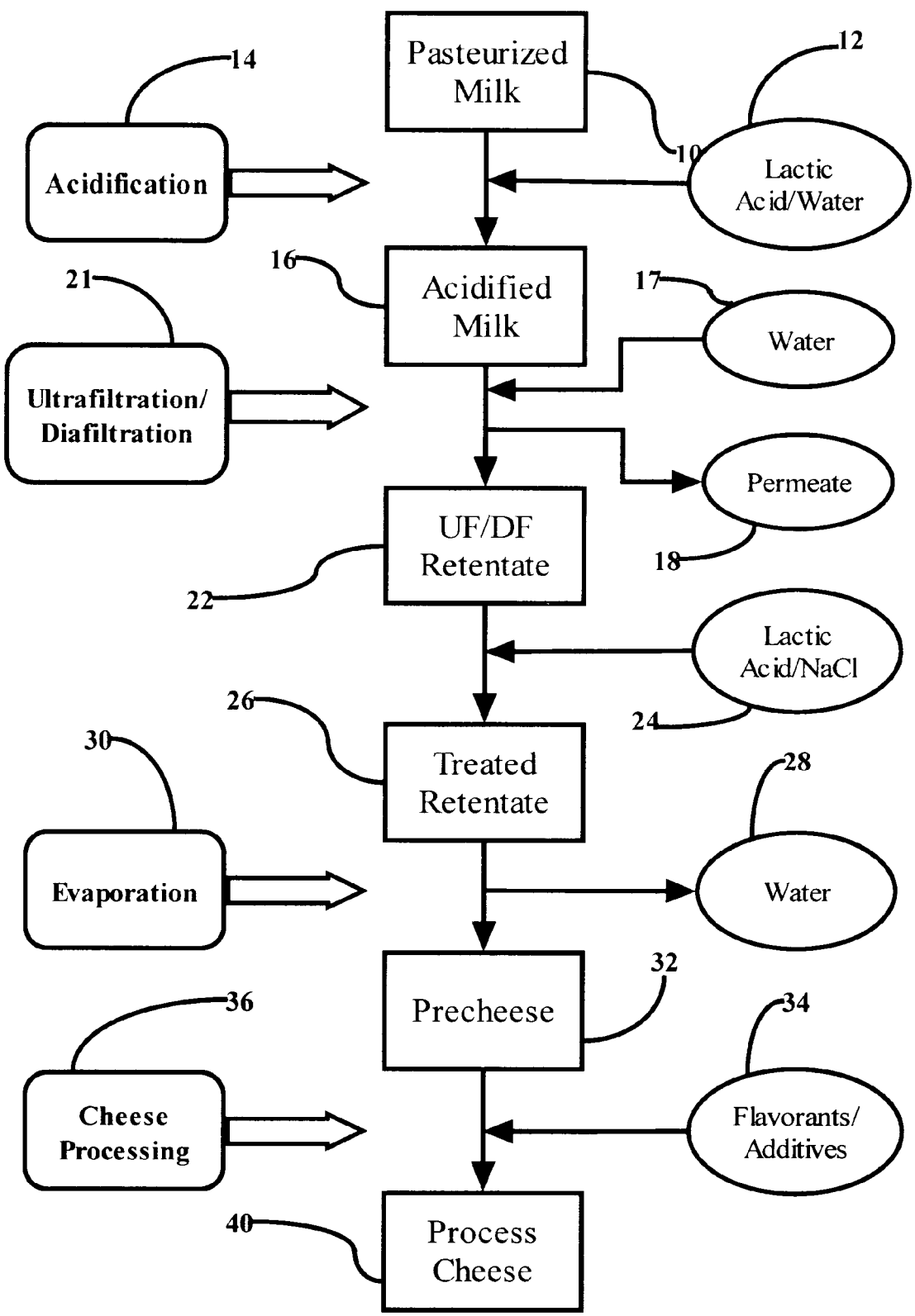
FIG. 2 is a flowchart illustrating another embodiment of the present invention using acidification, ultrafiltration, diafiltration, evaporation, and cheese processing.

The general process of the present invention is illustrated in FIGS. 1 and 2. One preferred embodiment of the present invention, as shown in FIG. 1, begins with pasteurized milk 10 prepared by conventional methods. Although not shown in FIG. 1, the starting pasteurized milk may be, if desired, standardized by the addition or removal of cream or the addition of dried milk powder (preferably pasteurized) or vegetable oil to achieve a desired composition of the resulting cheese product. Generally, the standardized milk will have a protein level of about 2.5 to about 4.0 percent. Pasteurized liquid milk 10 is acidified by adding lactic acid (or other edible acid) and water 12. If desired, salt (NaCl) can also be added; adding salt increases the ionic strength, provides additional free calcium, and helps prevent coagulation. After standing for about 4 to about 24 hours, the acidified milk achieves a pH of about 5.9 to about 6.5, preferably about 6.0 to about 6.3, and most preferably about 6.1. The total amount of lactic acid added during the entire process is determined by the desired pH of the resulting acidified milk. For convenience, the acidified milk can be subjected to overnight acidification 14. The pasteurized liquid milk can be derived from fresh whole milk, reduced-fat milk, or skim milk or from reconstituted powdered whole milk, reduced fat milk, or skim milk. Preferably, however, the liquid milk is reduced-fat milk or skim milk or from reconstituted powdered reduced fat milk or skim milk.

The resulting acidified milk 16 is then subjected to ultrafiltration 20, whereby permeate 18 is removed, to obtain a UF retentate 22. The permeate 18, which is essentially the only waste product produced in the present invention, can be returned to the dairy farmer for use as a feedstock, can be converted to alcohol or other useful products, or can be disposed of in an environmentally sound manner. The UF retentate 22 generally has a target lactose content of about 2.5 to about 4.0 percent. Lactic acid 24 (or other edible acid) is then added to the UF retentate to adjust the pH to about 4.9 to about 6.3, preferably to about 5.4 to about 5.8, and most preferably to about 5.6 in the treated retentate 26. Salt 24 can also be added, and preferably is added, with the lactic acid. Salt is generally added a level sufficient to obtain a final product 40 with a salt level of about 1.0 to about 3.5 percent. The treated retentate 26 is then subjected to an evaporation step 30 in order to remove water 28 and thereby produce a precheese 32 having a total solids content to about 30 to about 70 percent. The evaporation step can be carried out at elevated temperatures (generally less than about 90° F. and more preferably at about 70 to about 85° F. ) at atmospheric pressure or at lower temperatures under reduced pressure.

The resulting precheese 32 is then processed in a conventional cooker 36, generally at temperatures of about 150 to about 240° F. where it is blended with various flavorants, colorants, emulsifiers, and similar conventional additives to obtain a process cheese or process cheese-type product 40. The resulting process cheese or process cheese-type product can be packaged for retail sale or other use immediately. Curing, which results in a more homogeneous and favorable product, can take place during normal shipping periods (i.e., during the time the product is shipped to the retailer and stocked) under standard refrigeration conditions (i.e., about 35 to about 45° F.). Thus, a separate curing process, with its attendant presses, barrels, and the like, is not required.

Another preferred embodiment is illustrated in FIG. 2. The process shown therein differs from that in FIG. 1 mainly by the inclusion of a combined ultrafiltration/diafiltration step 21. The combined ultrafiltration/diafiltration step 21 allows for further reduction of lactose levels in the UF/DF retentate 22 (as compared to the UF retentate 22 in FIG. 1) while maintaining the solids content in the desired range. Water 17 is added to effect the diafiltration portion of the combined ultrafiltration/diafiltration step 21. The UF/DF retentate 22 generally has a lactose level less than about 2.5 percent (preferably from about 0.5 to about 2.5 percent) and a total solids content of about 15 to about 50 percent. Except for the combined ultrafiltration/diafiltration step 21, essentially the same steps are used as described above for FIG. 1. The process shown in FIG. 2 is preferably used if lower lactose levels in the final process cheese 40 are desired.

The resulting process cheese or process cheese-type product 40 can range from a process cheese in sliced or loaf form to a cheese sauce type mainly depending on the water content which is largely controlled by the evaporation step 30. For a sliced or loaf process cheese-type product, the moisture content is about 35 to about 60 percent; the protein content is about 10 to about 30 percent, and the salt content is about 1.5 to about 2.5 percent. For a sauce process cheese type product, the moisture content is about 45 to about 80 percent; the protein content is about 5 to about 25 percent, and the salt content is about 2.5 to about 3.5 percent. If desired, vegetable oil or other fat (e.g., cream, butter, and the like) could be added to increase the fat content; the addition of such vegetable oil could occur anywhere from the initial pasteurized milk 10 to the evaporation step 30. Adding vegetable oil may, however, require a separate homogenization step which is not shown in either Figure.

As illustrated in FIGS. 1 and 2, the present inventive processes have four basic steps: (1) acidification; (2) ultrafiltration with or without diafiltration; (3) evaporation; and (4) cheese processing or cooking. The milk (fresh or reconstituted) used can be whole, reduced-fat, or skim milk depending on the type of cheese desired. Preferably, the milk is reduced-fat or skim milk. Pasteurization of the liquid milk is carried out using conventional methods; normally a temperature of about 160 to about 180° F. for about 15 to about 30 seconds is sufficient. If desired, the milk can be standardized or fortified to a target protein level and/or protein/fat ratio by the incorporation of cream, dried milk product, vegetable oil, or other protein source. Acidification of the pasteurized milk is carried out by adding an appropriate edible acid to the pasteurized milk in an amount sufficient to yield the desired acidic pH. Suitable edible acids include, for example, lactic acid, citric acid, phosphoric acid, and the like. Normally the preferred acidification agent is lactic acid and the target pH is in the range of about 5.9 to about 6.5, preferably about 5.9 to about 6.2, and more preferably about 6.1. If desired, salt can also be added to allow for additional calcium removal. Generally, the pasteurized milk with added acid is held at about 25 to about 60° F., preferably about 35 to about 45° F. for at least about 4 hours to achieve the target pH. Preferably, the holding or standing time is about 4 to about 8 hours. If more convenient, the pasteurized milk with added acid can simply be held overnight. By having several tanks for holding the pasteurized milk with added acid, an essentially continuous supply of acidified milk can be obtained to allow the overall process to be run in a semi-continuous or continuous manner. If necessary, the acidified milk can be held for up to about 48 hours before further processing. It is generally preferred, however, that the acidified milk be subjected to further processing as soon as possible.

Once the acidified milk has achieved the desired pH range, it is concentrated using ultrafiltration with or without diafiltration to produce a UF/DF or UF retentate. Ultrafiltration with or without diafiltration is used to control the levels of lactose and solids. Ultrafiltration with diafiltration generally allows for lower lactose levels than ultrafiltration alone. Ultrafiltration is carried out using conventional and commercially available equipment at a temperature of about 100 to about 140° F. and a pressure of about 10 to 90 psi, and preferably about 20 to about 45 psi, to concentrate the acidified milk by a factor of about 4 to about 7, preferably to about 5 to about 6. Generally, lactose can be reduced to about 2.5 to about 4.0 percent and the solids content increased to about 15 to about 50 percent using ultrafiltration alone. If further reduction of lactose is desired, ultrafiltration combined with diafiltration can be used to reduce the lactose level while maintaining the solids content at a desired level. Generally, the lactose can be reduced to less than about 2.5 percent, and preferably about 0.5 to about 2.5 percent using ultrafiltration with diafiltration. The UF retentate generally has a pH of about 6.1 to about 6.4, a lactose level of about 2.5 to about 4.0 percent, and a solids content of about 15 to about 50 percent. The UF/DF retentate generally has a pH of about 6.1 to about 6.4, a lactose level of less than about 2.5 (preferably about 0.5 to about 2.5), and a solids content of about 15 to about 50 percent. For preparing a fat-free cheese, the solids content of the UF retentate or UF/DF retentate will preferably be in the range of about 20 to about 25 percent. For preparing a full-fat cheese, the solids content of the UF retentate or UF/DF retentate will preferably be in the range of about 35 to about 45 percent.

The UF or UF/DF retentate is then treated with a suitable edible acid (preferably lactic acid) to bring the pH to about 4.9 to about 6.3, preferably about 5.4 to about 5.8, and most preferably about 5.6. If desired, salt can also be added with the edible acid. Preferably the edible acid used to adjust the pH of the UF or UF/DF retentate is the same edible acid used in the acidification step 14; preferably, both edible acids are lactic acid. The solids content of the treated UF or UF/DF retentate is then increased to about 30 to about 70 percent by evaporation in order to produce a precheese. Preferably the evaporation step is carried out at a temperature of less than about 85° F. and a reduced pressure of about 7 to about 21 mm Hg. If desired, a small amount of cheese coagulant (generally less than about 0.05 percent and more preferably less than about 0.01 percent based on the finished precheese) can be added before the evaporation step. Such coagulants generally improve the meltability of the final cheese product. Suitable cheese coagulants include calf rennet, Chymax™, Marzyme Supreme™, and the like.

For preparing a fat-free cheese, the solids content of the precheese will preferably be in the range of about 40 to about 50 percent. For preparing a full-fat cheese, the solids content of the precheese will preferably be in the range of about 60 to about 68 percent. The UF or UF/DF retentate can be preheated, if desired, prior to entry to the evaporation unit; preheated retentate can reduce "burn-on" in the evaporator. Although other evaporation equipment or techniques can be used, it is generally preferred that the evaporation is carried out using a swept-surface evaporator or a vacuum drum drier. Generally, the temperature of the evaporation step is not as critical as it is in enzyme- or microorganism-based cheeses processing since there are no enzymes or microorganisms that could be inactivated in the present process. However, the temperature of the evaporation should be below that at which the fat would separate (i.e., phase separation or oiling off). Thus, a higher evaporation temperature could be used for fat-free chesses as compared to full-fat cheeses. Generally, the temperature for evaporation of a fat-free or full-fat retentate should be below about 150° F. and preferably in the range of about 70 to about 90° F. The precheese prepared from UF retentate generally has a pH of about 4.9 to about 6.3, a lactose level of about 3.7 to about 8 percent, and a solids content of about 30 to about 70 percent. The precheese prepared from UF/DF retentate generally has a pH of about 4.9 to about 6.3, a lactose level of about 0.7 to about 3.7 percent, and a solids content of about 30 to about 70 percent.

The precheese is then processed into a process cheese or process cheese-type product using conventional cheese processing techniques by blending the precheese at elevated temperature with emulsifiers, flavorants, colorants, stabilizers, preservatives, and the like. Preferably the precheese is converted to a process cheese or process cheese-type product in a conventional cooker operated at about 150 to about 240° F., and preferably in a steam-injected laydown cooker at about 165 to about 200° F., using standard emulsifying salts. Suitable emulsifying salts include, for example, disodium phosphate, monosodium phosphate, dipotassium phosphate, trisodium phosphate, sodium metaphosphate, sodium acid pyrophosphate, tetrasodium phosphate, sodium tripolyphosphate, sodium aluminum phosphate, sodium hexametaphosphate, sodium citrate, potassium citrate, calcium citrate, sodium tartrate, and mixtures thereof. Preferred emulsifiers include disodium phosphate and sodium citrate. Other additives—such as, for example, flavorants, colorants, stabilizers, preservatives, vitamins, protein additives, starches, and the like—can be added during this final processing step. Because flavor is controlled by flavor additives that are added before or during the final processing step, more consistent and controllable flavor can be obtained as compared to conventional cheese-making processes using enzymes and/or microorganisms. Flavor additives can include, if desired, enzyme- and/or microorganism-produced cheeses. Such enzyme- and/or microorganism-produced cheeses would only be added at or during the last major step in the process (i.e., just before or in the cooker 40); thus, for purposes of this invention, the process would still be considered to be free of such enzymes, cultures, and/or microorganisms.

The overall process, starting with acidified milk, can be completed in a period of only a few hours. Using a batch process, the time required from acidified milk to the UF or UF/DF retentate is about one hour; from UF or UF/DF retentate to precheese, it is about one hour; and from precheese to process cheese-type product, it is about three hours. Thus, the total time from acidified milk to process cheese-type product is only about five hours. In commercial and semi-continuous or continuous operation, the time from acidified milk to process cheese-type product is expected to be significantly shorter (e.g., about 1 to about 3 total hours). So long as sufficient acidified milk is available, the present cheese-making process could easily operate on a continuous basis. Sufficient acidified milk for continuous operation can be obtained using multiple acidification vessels operated with staggered completion times so that completed acidified milk is ready in one tank as acidified milk from the previous tank is consumed in the process.

The resulting cheese can be packaged for retail sale or other use immediately, after sufficiently cooling, without the need for a separate curing step. Generally, however, some curing is desirable to fully develop the desired flavor and texture characteristics. This curing can take place at refrigeration temperatures in a relatively short time. Generally, sufficient curing will have taken place during the time the product is shipped and displayed on a retailer's shelf (i.e., about 1 to about 2 weeks).

The following examples further illustrate various features of the invention but are not intended to limit the scope of the invention as set forth in the appended claims.

EXAMPLE 1

This example illustrates the preparation of pasteurized process cheese food slices using ultrafiltration without difiltration. Fresh whole milk (5000 lbs) was pasteurized at 163° F. for 16 seconds. Pasteurized cream (100 lbs) was added to the milk to adjust the protein/fat ratio to 0.76. The standardized milk was cooled to about 40° F. at which time sufficient lactic acid was added to adjust the pH to about 6.1. After holding overnight (17 total hours), the acidified milk was heated to about 115° F. for UF processing. The milk was concentrated by a factor of about 4.6 using an Abcor spiral wound membrane system (Koch Membrane Systems, Inc., Wilmington, Mass. 01887). The resulting UF retentate was 36.5 percent solids, 18.5 percent fat, 13.6 percent protein, and 3.2 percent lactose. Lactic acid was added to reduce the pH to about 5.6; about 1.6 percent salt was also added. Water was removed from the treated UF retentate using a Turba-Film swept surface vacuum evaporator (LCI Corporation, Charlotte, N.C. 28297) operated at about 82° F. and about 20 mm Hg. The resulting precheese had a water content of about 40 percent. Enzyme-modified cheese (about 5 percent) was added for flavor. Emulsifiers (about a 2/1 ratio of sodium citrate and disodium phosphate) were added at about 2.3 percent. Sorbic acid and process cheese colorants (annatto and apocarotenal) were also added in relatively small amounts (less than about 0.5 percent). The resulting mixture was processed at about 172° F. in a Damrow direct steam injection cooker (Damrow Co., Inc., Fond du Lac, Wis. 54936) until a homogenous mixture was obtained (about 15 minutes). Slices were formed using a hot-pack cheese slice former. The resulting slices had a moisture content of 44 percent, a fat content of 26 percent, a protein content of 19 percent, a salt content of 1.9 percent, a lactose content of 5.7 percent, and a pH of 5.72. The texture, flavor, and meltability of the slices were similar to a typical pasteurized process cheese food prepared using conventional techniques. The time required from acidified milk to final product in this batch process trial was about 2 hours.

EXAMPLE 2

This example illustrates the preparation of pasteurized process cheese slices using ultrafiltration with difiltration. Essentially the same process as described in Example 1 was followed except that diafiltration was used to reduce the lactose levels. More specifically, the UF retentate was diafiltered twice with volumes of soft water equal to the weight of the retentate. The composition of the UF/DF retentate was similar to the UF retentate from Example 1 except that the lactose level was reduced to about 0.8 percent. The UF/DF retentate was treated in the same manner as in Example 1. The resulting slices had a moisture content of 39 percent, a fat content of 33 percent, a protein content of 20 percent, a salt content of 2.1 percent, a lactose content of 1.1 percent, and a pH of 5.75. The texture, flavor, and meltability of the slices were similar to a typical pasteurized process cheese prepared using conventional techniques. The time required from acidified milk to final product in this batch process trial was about 2.5 hours.

EXAMPLE 3

This example illustrates the preparation of pasteurized process fat-free cheese slices using ultrafiltration without diafiltration. Fresh whole milk was processed using conventional centrifugal separation procedures to obtain a skim milk with a fat content of about 0.1 percent. The skim milk (about 5000 lbs) was pasteurized at 161° F. for 16 seconds. After cooling the pasteurized skim milk to about 40° F., it was treated with lactic acid to reduce the pH from its initial value of 6.65 to 6.16. The acidified skim milk was held overnight at 42° F. The acidified skim milk was then heated to 120° F. for ultrafiltration. The milk was concentrated by a factor of about 5 using the Abcor spiral wound membrane system. The resulting UF retentate was 23 percent solids, 15 percent protein, and 4.4 percent lactose. Lactic acid was added to reduce the pH to about 5.6; about 0.5 percent salt was also added. Water was removed from the treated UF retentate using the Turba-Film swept surface vacuum evaporator operated at about 75° F. and about 20.5 mm Hg. The resulting precheese had a water content of about 56 percent and a salt content of about 1 percent. Nonfat dry milk (about 4.5 percent), dry corn syrup solids (about 3.4 percent), buttermilk solids (about 1.0 percent), and cellulose gel (about 5.0 percent) were combined with the precheese. Emulsifiers (about a 1/6 ratio of sodium citrate and disodium phosphate) were added at about 2.8 percent. Sodium chloride, carrageenan, sorbic acid, a flavor system, and process cheese colorants (annatto and apocarotenal) were also added in relatively small amounts (less than about 0.5 percent). The resulting mixture was processed at about 200° F. in the Damrow direct steam injection cooker until a homogenous mixture was obtained (about 15 minutes). Slices were formed using a hot-pack cheese slice former. The resulting slices had a moisture content of 58 percent, a fat content of 0.5 percent, a protein content of about 22 percent, a salt content of 2.0 percent, a lactose content of 8.8 percent, and a pH of 5.76. The texture, flavor, and meltability of the slices were similar to a typical fat-free pasteurized process cheese product prepared using conventional techniques. The time required from acidified milk to final product in this batch process trial was about 2.5 hours.

COMPARATIVE EXAMPLE

This example, which is included for comparison purposes only, is based on the simplified process described in U.S. Pat. No. 4,497,834 to produce a dairy-based food product using ultrafiltration to remove lactose. Liquid whole milk (3.6 percent fat, 3.1 percent protein, and 4.8 percent lactose) was pasteurized and processed in a spiral wound ultrafiltration system at 120° F. to a 5-fold concentration. The ultrafiltration concentrate contained 18.3 percent fat, 15.0 percent protein, and 3.2 percent lactose. The ultrafiltration concentrate was further heat-treated at 165° F. for 25 sec, cooled to 45° F., and held for further processing. Although U.S. Pat. No. 4,497,834 indicated that lactose could be reduced by 50 percent, the best reduction we could obtained was about 33 percent.

The resulting concentrated, ultrafiltered whole milk retentate (about 9 lb) was placed into a jacketed Hobart mixer and slowly heated to 100° F. using indirect steam. While applying continuous agitation to the retentate (6.42 pH), Is lactic acid (about 0.2 lbs), salt (about 0.06 lbs), enzyme-modified cheese (about 0.2 lbs), and rennet (about 0.003 lbs in about 0.03 lbs water) were added. The retentate (5.44 pH) was held for about ten minutes at 100° F. before heating to 175° F. over a period of 20 minutes. Emulsifying salts (about 0.2 lbs sodium citrate and about 0.03 lbs sodium hexametaphosphate) were added with continued mixing and heating. The mixture (5.62 pH) was held for an additional 5 minutes at 180° F. and then packaged into 2 lbs loaf boxes and 8 oz. glass jars. The processed product was placed into refrigerated storage and allowed to cool down to 40° F.

The resulting products were subjected to conventional organoleptic evaluations. The loaf product had a soft body with essentially no cheese or cheese-like structure; its texture was doughy with a chalky mouthfeel with a drying effect; and its flavor was very milky with essentially no cheese flavor. The jar product had a soft body, rough texture, an open, short knit, and a bland, buttery flavor. This jar product was considered more like a coldpack cheese rather than the desired process cheese. Upon melting, the products exhibited unstable emulsions with severe oil-off and a mealy and grainy texture.

The supposedly cheese-like products provided in U.S. Pat. No. 4,497,834 were clearly not acceptable and decidedly inferior to the process cheese-type product of the present invention produced directly from liquid milk.

What is claimed is:

1. A method for producing a process cheese-type product directly from milk, said method comprising:

(a) treating pasteurized milk with a first edible acid to obtain acidified milk having a pH in the range of about 5.9 to about 6.5;

(b) reducing the lactose content of the acidified milk to about 2.5 to about 4.0 percent and increasing the solids content to about 15 to about 50 percent using ultrafiltration to obtain a UF retentate;

(c) adjusting the pH of the UF retentate to about 4.9 to about 6.3 percent by the addition of a second edible acid to form a treated UF retentate;

(d) removing sufficient water from the treated UF retentate by evaporation to obtain a precheese having a total solid content of about 30 to about 70 percent; and (e) blending emulsifiers and flavor additives with the precheese at a temperature of about 150 to about 240' F. for a time sufficient to obtain a homogenous process cheese-type product;

wherein enzymes, cultures, or microorganisms are not employed and wherein there is no formation or separation of curds and whey.

2. A method as defined in claim 1, wherein both the first and the second edible acids are lactic acid, wherein the pH of the acidified milk in step (a) is in the range of about 6.0 and about 6.3, and wherein the pH of the UF retentate in step (c) is in the range of about 5.4 to about 5.8.

3. A method as defined in claim 2, wherein the evaporation in step (d) is carried out using a swept-surface evaporator and the blending in step (e) is carried out in a laydown cooker.

4. A method as defined in claim 2, wherein the pasteurized milk is a pasteurized full-fat milk.

5. A method as defined in claim 2, wherein the pasteurized milk is a pasteurized reduced-fat milk.

6. A method as defined in claim 2, wherein the pasteurized milk is a pasteurized skim milk.

7. A method for producing a process cheese-type product directly from milk, said method comprising:

(a) treating pasteurized milk with a first edible acid to obtain acidified milk having a pH in the range of about 5.9 to about 6.5;

(b) reducing the lactose content of the acidified milk to less than about 2.5 percent and increasing the solids content to about 15 to about 50 percent using ultrafiltration and diafiltration to obtain a UF/DF retentate;

(c) adjusting the pH of the UF/DF retentate to about 4.9 to about 6.5 percent by the addition of a second edible acid to form a treated UF/DF retentate;

(d) removing sufficient water from the treated UF/DF retentate by evaporation to obtain a precheese having a total solid content of about 30 to about 70 percent; and (e) blending emulsifiers and flavor additives with the precheese at a temperature of about 150 to about 240° F. for a time sufficient to obtain a homogenous process cheese-type product;

wherein enzymes, cultures, or microorganisms are not employed and wherein there is no formation or separation of curds and whey.

8. A method as defined in claim 7, wherein both the first and the second edible acids are lactic acid, wherein the pH of the acidified milk in step (a) is in the range of about 6.0 and about 6.3, wherein the pH of the UF retentate in step (c) is in the range of about 5.4 to about 5.8, and wherein the lactose content of the UF/DF retentate in step (b) is about 0.5 to about 2.5 percent.

9. A method as defined in claim 8, wherein the evaporation in step (d) is carried out using a swept-surface evaporator and the blending in step (e) is carried out in a laydown cooker.

10. A method as defined in claim 8, wherein the pasteurized milk is a pasteurized full-fat milk.

11. A method as defined in claim 8, wherein the pasteurized milk is a pasteurized reduced-fat milk.

12. A method as defined in claim 8, wherein the pasteurized milk is a pasteurized skim milk.

* * * * *